United States Patent Office 3,425,437
Patented Feb. 4, 1969

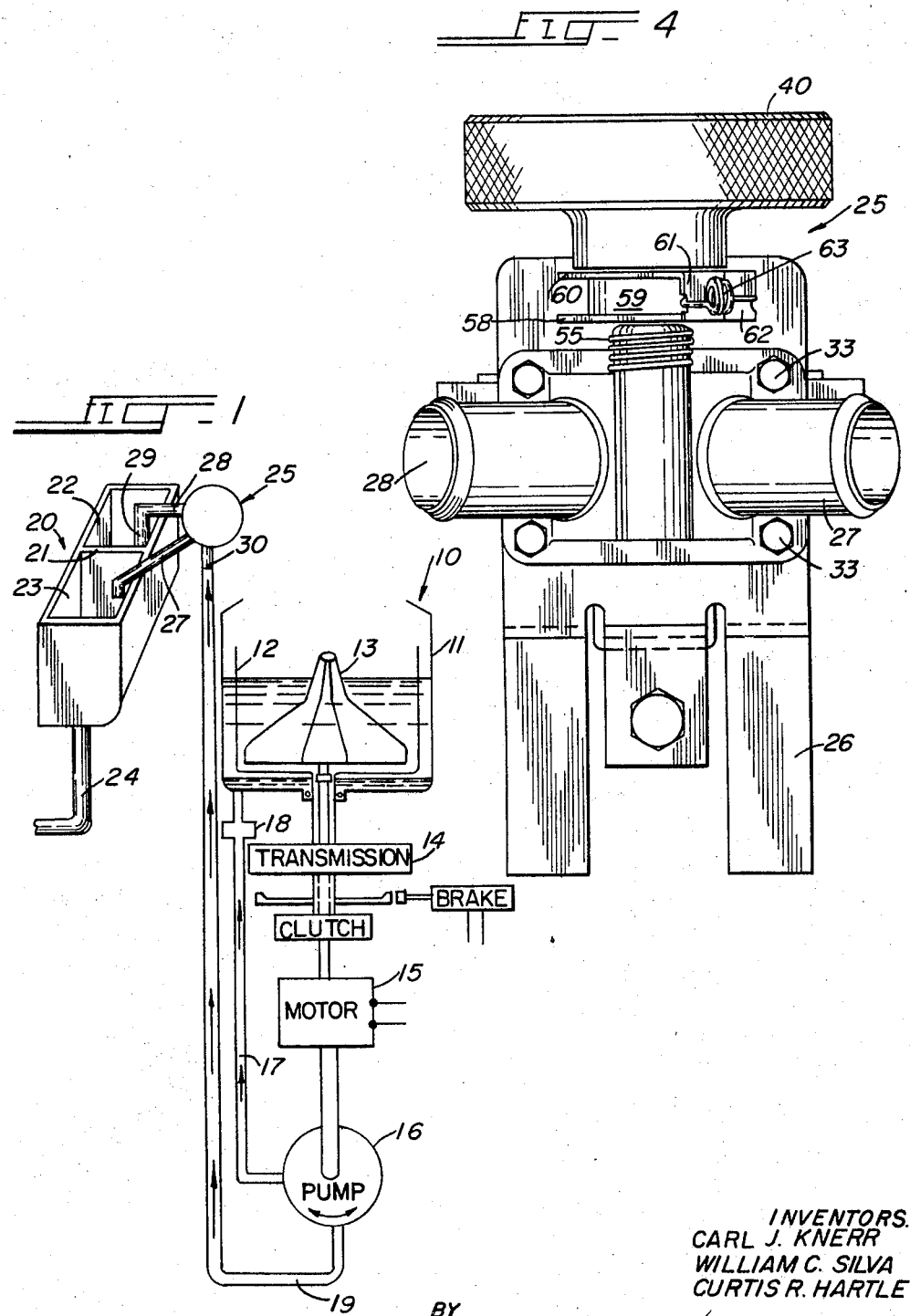

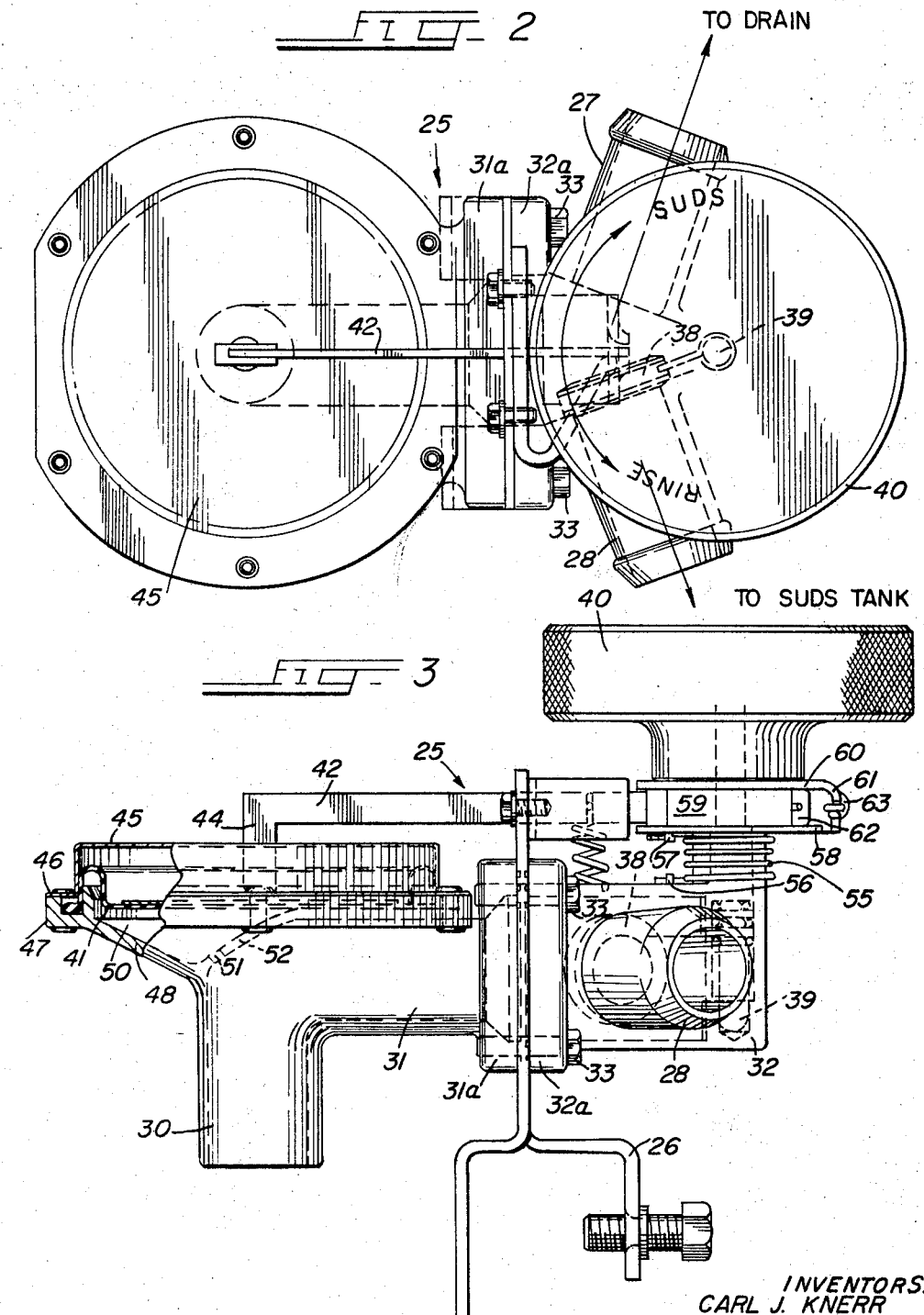

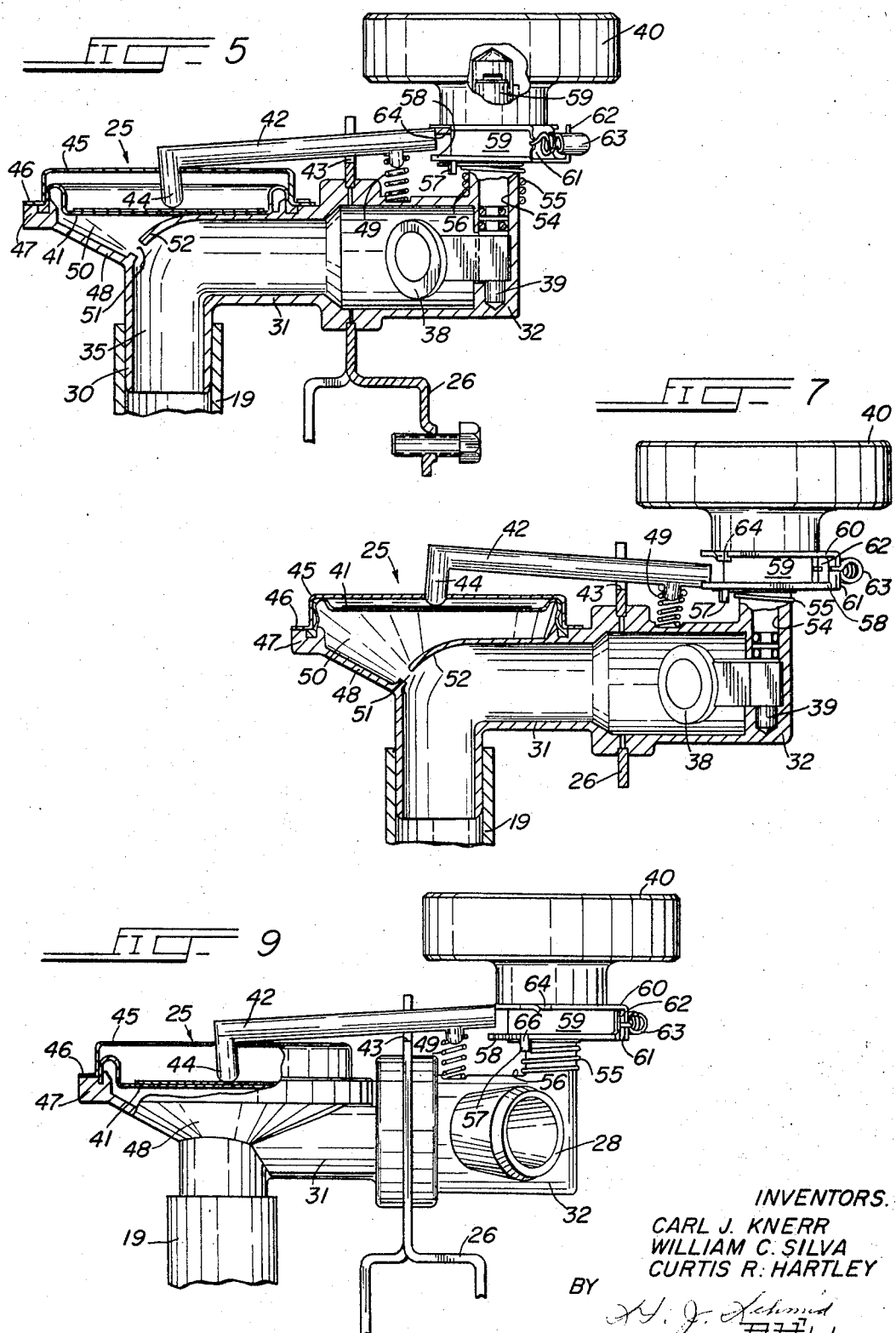

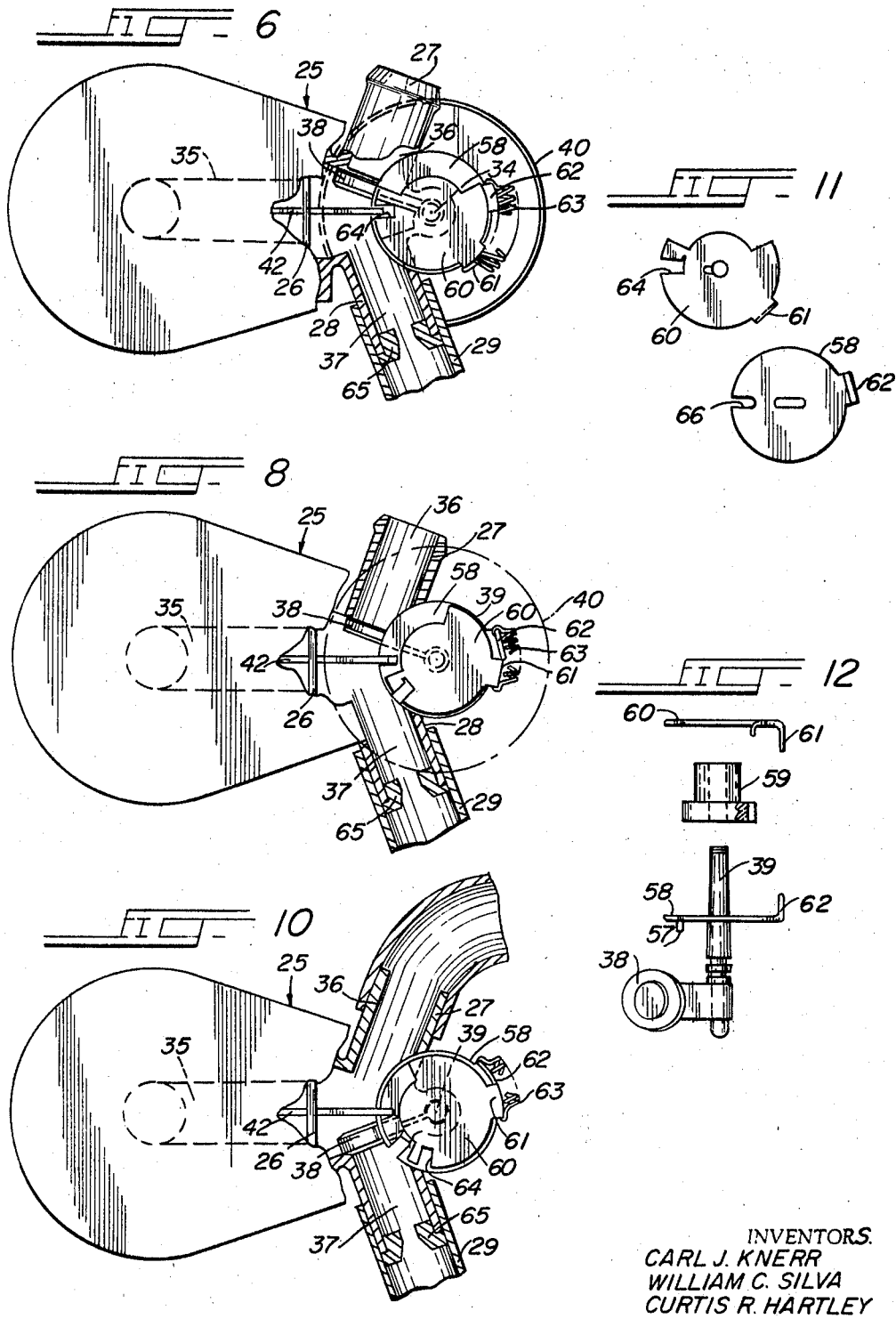

3,425,437
FLUID CONTROL DEVICE FOR AUTOMATIC LAUNDRY MACHINES
Carl J. Knerr and William C. Silva, Herrin, and Curtis R. Hartley, West Frankfort, Ill., assignors, by mesne assignments, to Fedders Corporation, a corporation of New York
Filed Feb. 2, 1967, Ser. No. 613,640
U.S. Cl. 137—119      15 Claims
Int. Cl. D06f 41/00, 39/08; G05d 7/06

ABSTRACT OF THE DISCLOSURE

A suds-saver device for use with laundry machines having a pump for emptying suds-water and rinse water from the laundry machine tub and flow of the suds-water to a storage reservoir and the rinse water to a drain, the device having valve mechanism manually settable to direct suds-water, under pump pressure, to the reservoir and operable, by the pressure of the suds water, to automatically condition the valve to subsequently direct rinse water to the drain.

Summary of the invention

This invention relates to a fluid control device for laundry machines and more particularly to a suds-water saving control device for laundry machines.

Suds-water saving control arrangements are employed in laundry machines to provide for the economical re-usage of the suds-water for several washing operations, the suds-water being evacuated from the laundry machine for storage in a reservoir, after each washing operation, and subsequently transferred from the reservoir to the machine for re-use in a new laundry operation.

Various known suds-water saver controls are expensive and complicated and employ components, such as electrical solenoid-operated valves or pivotal tubes or hoses, or mechanically-operated valves or pivotal hoses actuated by floats responsive to the suds-water level in the storage reservoir, these controls being operable to automatically control the flow of suds-water to the reservoir for re-use and thereafter the flow of used rinse water to a drain. In addition, such controls are frequently built into and form integral components of the laundry machines, usually requiring a multiplicity of pumps and valves in the performance of their function.

The present invention contemplates as one of its objectives the provision of a new and improved simplified suds-water saving control device for laundry machines.

Another object of the invention is to provide a new and improved suds-water saving control device employing valve-operating mechanism hydraulically controllable by pressure of the suds-water flowing to a storage reservoir to condition the mechanism for automatically operating the valve to subsequently direct rinse water to a drain.

A further object of the invention is to provide an improved suds-water saving control device and comprising valve control mechanism, and a pump providing for the flow of suds-water to a storage reservoir, and in which the pressure of the suds-water controls the mechanism for operation to move the valve to direct rinse water to a drain, upon completion of transfer of the suds-water to the reservoir.

A further object of the invention is to provide a suds-water control adapted for use as an accessory in conjunction with any automatic laundry machine.

A specific object of the invention is to provide a new and improved suds-water saving system having a two-way diverter valve; control mechanism for the valve and releasably holding the valve to direct suds-water from a laundry machine to a reservoir and releasable to effect movement of the valve to direct rinse water to a drain; a hydraulically-operated device controlling the mechanism and responsive to the pressure of suds-water pumped to the reservoir to effect release of the mechanism to move the valve to its drain position, upon completion of suds-water transfer to a storage reservoir.

Further objects and advantages of the invention will become apparent from the following description with reference to the accompanying drawings, the features of novelty characterizing the invention being pointed out particularly in the claims annexed to and forming a part of this specification.

Brief description of the drawings

In the drawings:

FIG. 1 is a schematic view of the improved suds-water saving control device illustrating its connection with and use in conjunction with a laundry machine and storage reservoir and drain sinks;

FIG. 2 is a top view of the control device;

FIG. 3 is a side view of the control device;

FIG. 4 is a front view of the control device;

FIGS. 5 and 6 are side and top views of the control device, partly broken away, illustrating the relative position of the valve, and controlling mechanical and hydraulically-operated components of the control device during initiation of flow of suds-water from the laundry machine;

FIGS. 7 and 8 are side and top views of the control device, similar to FIGS. 5 and 6, but illustrating the position of the valve and its control components, during full flow of suds-water from the laundry machine;

FIGS. 9 and 10 are side and top views of the control device, similar to FIGS 5 and 6, but illustrating the position of the valve and components, at the conclusion of the suds-water saving operation;

FIG. 11 is an exploded view of the valve-operating parts of the mechanical components shown in FIGS. 2–10; and FIG. 12 is an exploded view of the control discs of the mechanical components shown in FIGS. 2–10.

Description of the preferred embodiment

Referring to FIG. 1, there is schematically illustrated an automatic washing, rinsing and drying machine indicated generally by the reference numeral 10. The machine comprises a tub or container 11, a clothes-containing basket 12, an agitator 13, a transmission 14 for oscillating the agitator and rotating the basket, and a reversible drive motor 15 connected to the transmission. The motor 15 is also connected to a pump 16 operable, during the wash-agitate operation of the machine, to rotate in a counter-clockwise direction to pump the suds-water toward the tub through a hose 17 connected to the sump or outlet 18 of the tub and to the pump. During the suds-water-extraction period, the motor is reversed and the pump rotates in a clockwise direction to pump the suds-water from the tub, via outlet 18, and through a hose 19. During the subsequent rinse period, fresh water is supplied to the tub and the agitator is oscillated by the transmission, the motor rotating in a counterclockwise direction to pump the rinse water toward the tub. After sufficient time has elapsed to insure thorough rinsing of the clothes, the motor is reversed to rotate the pump, the container, and the transmission in a clockwise direction, the pump operating to evacuate the rinse water from the tub for flow through the hose 19.

The automatic washing machine 10 is generally of the type described and claimed in detail in U.S. Patent 3,269,153 entitled "Automatic Washer" and issued Aug. 30, 1966, and reference may be had to this patent for a detailed description of the washing machine structure.

It is desirable to save the suds-water, after the first batch of clothes has been washed, for additional clothes-washing operations of the machine, while providing for the flow of rinse water to a drain. For this purpose, a stationary tub 20 is divided by a partition 21 to provide sinks 22 and 23 connected to a common drain tube 24, the sink 22 being plugged to prevent discharge of water to the tube 24 and thus provide a suds-water storage reservoir, while the sink 23 is in fluid communication with the drain tube 24 for flow of rinse water to a sewer.

The suds-water saver control device, to which the present invention relates, is indicated generally in the drawing by the reference numeral 25. The control device is designed to be employed as an accessory for conventional non-sudsaver automatic washing machines and, for this purpose, is mounted on the tub 20 by a bracket clamp indicated at 26 in a manner to dispose two spouts 27 and 28 of the device in positions wherein the spout 27 is located to discharge into the drain sink 23 and the spout 28 into a hose 29 extending downwardly into the suds-water storage sink 22. The control device is also provided with tubular portion forming a spout 30 disposed exteriorly of the tub 20 and extending downwardly for connection to the hose 19. The body of the control device is formed in two hollow sections 31 and 32 (FIG. 3) with screws 33 securing together laterally extending end flanges 31a and 32a of the sections 31 and 32, the outer edges of the mating flanges and defining a recess receiving the mounting bracket 26 to support the device on the tub 20, as shown in FIG. 5.

As seen in FIG. 6, the hollow sections 31 and 32 provide a fluid passage 35 having two branches 36 and 37 provided by spouts 27 and 28, flow of fluid between passage 35 and the branch 36 or 37 being controlled by a two-way flapper valve 38 pivoted for rotation on a shaft 39 and movable to direct fluid either through the spout 27 into drain sink 23 or through the spout 28 into the storage sink 22. As seen in FIGS. 6 and 8, the valve 38 is shown in position to close the branch 36 to preclude suds-water flowing through spout 27 into the drain sink while permitting the suds-water to flow through branch passage 37 (spout 28) into the storage reservoir 22.

The suds-water saver device is provided with a control arrangement for operation of the two-way valve so that the valve can be operated to discharge suds-water into the sink 22, to discharge rinse water into the sink 23, and to return the suds-water to the washing machine. For this purpose, a manually-operated knob 40 is operative to rotate the valve to close the branch passage 36 so that suds water will flow through branch passage 37 into the storage sink 22. The valve 38 is releasably held in this suds-water saving position by a trigger mechanism. The trigger mechanism is also controlled by a hydraulically-operated diaphragm 41 responsive to the pressure of the suds-water pumped through the passage 35 and branch passage 37 into the storage sink and operative to condition the trigger mechanism to automatically release the valve for movement to its drain position when pressure on the diaphragm drops by the completion of transfer of the suds water by the pump from the washing machine tub to the storage sink.

More particularly, the trigger mechanism comprises a control member or latch in the form of a lever 42 extending through a slot 43 in an upwardly extending portion of the bracket 26 and pivotally supported on the upper end of the slot-defining edge thereof, the lever having one end provided with a laterally-offset foot 44 extending downwardly and engaging the flexible diaphragm 41. The lever foot extends through a slot in a cover 45 enclosing the diaphragm, the cover having a peripheral flange 46 secured to an annular seat 47 of a fluid pressure chamber portion 48 of the body section 31 of the control device. The lever foot 44 is maintained in engagement with the diaphragm by the pressure of a coil spring 49 seated on and confined between the body section 32 and lever 42.

The diaphragm 41 closes the upper portion of a chamber 50 connected to the passage 35 by an orifice or bleed hole 51 in a wall 52 of the body section 31 separating the chamber and passage. Upon suds-water flowing, under pump pressure, into and through the spout 30, passage 35, and branch passage 37, water enters the chamber 50 to move the diaphragm 41 upwardly to rotate the lever 42 against the action of spring 49.

The trigger mechanism further comprises means, cooperating with the lever and diaphragm, for automatically controlling rotation of the valve from its first suds-water saving position to its second rinse water position upon the conclusion of transfer of the suds-water from the laundry machine tub to the storage sink. In explanation, the valve is fixed to and rotatable with the shaft 39 mounted in a cylindrical bore 54 of the body section 32, the bore communicating with an opening through which the valve extends into the fluid passage 35. Suitable O-ring seals are positioned on the shaft to prevent fluid flow upwardly of the shaft. The valve is normally held in its rinse water position, in which branch 37 of the passage 35 is closed, by a first spring 55 coiled about an upper cylindrical portion of the body 32 and partly defining the bore 54, with one end of the spring engaging a pin 56 fixed to the body 32 and the other end of the spring engaging a tab 57 of a first control member or disc 58 keyed to the shaft 39. The constant pressure of the spring, exerted on the shaft, acting to position the valve in sealing relation to the branch 37, as shown in FIGS. 2, 9 and 10.

To move valve 38 from its rinse water position to its suds-water saving position, the knob 40 is rotated clockwise (FIG. 2) from the "RINSE" position to its "SUDS" position thereby rotating the valve to close the branch passage 36 (spout 27) and open the branch passage 37 (spout 28). The knob 40 is connected to a cylindrical bushing 59 supported on the shaft 42 and rotatable relative to the shaft and the disc 58. The bushing 59 extends through an opening in a third control member or disc 60 and is keyed to the disc so that the knob 40, bushing 59 and disc 60 are coupled for conjoint rotation. The disc 60 has a downwardly projecting tab 61 located in spaced relation to an adjacent upwardly extending tab 62 on disc 58, a third coil spring 63 extending between and having its opposite ends respectively engaging the tabs 61 and 62 and urging the tabs toward each other. When the knob is manually rotated to the "SUDS" position, the knob is effective to rotate the disc 60 until its notch 64 is positioned in alignment with the end of the lever, the spring 49 pivoting the lever to position the lever end in the notch. During rotation of the knob and disc 60, spring 63 is effective to rotate disc 58 and thereby shaft 38 in a clockwise direction to move the valve from its rinse water position to its suds-water-saving position shown in FIGS. 5 and 6. It will be noted that the tabs 61 and 62 have moved apart radially thereby extending spring 63 to apply pressure on the valve to close the branch passage 36 in spout 27 for flow of the suds-water through branch passage 37 in spout 28 and hose 29 to the storage sink. Also, spring 55 is wound by movement of disc 58 to store energy for later operation of the valve to its rinse water position.

Referring to FIGS. 5 and 6, assuming the automatic washer is in its spin-extract operation with the pump operating to pump the suds water from the washer, suds-water, under pressure by the pump, flows through hose 19 and into and through fluid passage 35 and branch passage 37 into the storage reservoir 22. It will be noted in FIG. 6 that the end of spout 28 has a rubber ring 65 secured thereto and extending into the branch passage 37 of the spout to restrict the flow of suds-water into the hose 29 and create a back pressure causing suds-water to flow from passage 35 into the opening 51 in the wall 52 and into the chamber 50 to force the diaphragm 41 upwardly to rotate lever 42 in a clockwise direction (FIG. 5) against the action of spring 49 to the position shown in FIGS. 7 and 8. Rotation of lever 42 causes the right end of the lever to be removed from the notch 64 of disc 60 and into a notch 66 in disc 58 fixed to and movable with the valve-operating shaft 39. As a consequence, the valve is retained in its suds-saving position.

Upon evacuation of the suds-water from the washer to the suds reservoir, the water pressure drops and the water in chamber 50 flows downwardly through the opening 51 in wall 52 and into the passage 35. When the pressure is removed from diaphragm 41, compressed spring 49 rotates lever 42 counterclockwise (FIG. 7) to remove the lever from engagement with disc 58 so that spring 55 uncoils to rotate shaft 39, discs 58 and 60, knob 40 and valve 38 as an assembly. This movement causes valve 38 to open the branch passage 36 in spout 27 and close branch passage 37 in spout 28 so that, during the subsequent rinse-extract operation of the washer, rinse water is pumped through passage 35, branch passage 36 of spout 27 into the drain sink 23. At this time, the components of the device are in the positions shown in FIGS. 9 and 10.

It will be apparent that, when the suds-water is to be removed from the storage sink to the washer tub for a new laundry operation, the knob is rotated to the "SUDS" position shown in FIG. 5 to move, and releasably hold, the valve to close passage 36 so that rotation of the pump in a counterclockwise direction (FIG. 1) will provide a sucking action by the pump effective to withdraw the suds-water from the reservoir sink for flow through open passages 36 and 35, hose 19, pump 16, hose 17 to the washer tube 11.

Should an election be made not to save suds-water prior to initiating the laundry operation, manual actuation of the knob is unnecessary as the suds water will be directed through the sudsaver device to the drain sink.

We claim:

1. In cleaning apparatus having a fluid container provided with an outlet; a valve connected to said outlet and adapted for communication with a storage reservoir and drain and having a first position for directing fluid to said reservoir and having a second position for directing fluid to said drain; pump means energizable to pump fluid from said container to said valve; the combination therewith of control means for said valve and including mechanical means for releasably holding said valve in its first position and operable to release said valve and move said valve to its second position; and means responsive to the pressure of the fluid, flowing from said container to said valve during operation of said pump means, for controlling operation of said mechanical means.

2. In cleansing apparatus as defined in claim 1 wherein the fluid pressure responsive means is operatively connected to the mechanical means to condition the mechanical means to release and move the valve to its second position upon dropping of fluid pressure on the fluid pressure responsive means by completion of fluid transfer from the container to the reservoir.

3. In cleansing apparatus as defined in claim 1 wherein the mechanical means includes a trigger mechanism releasably holding the valve in its first position.

4. In cleansing apparatus as defined in claim 3 wherein a spring is operative to release the trigger mechanism, and the fluid pressure responsive means controls the operation of the spring.

5. In cleansing apparatus as defined in claim 1 wherein the fluid pressure responsive means includes a flexible diaphragm, movable by fluid pressure, to control operation of the mechanical means.

6. In cleansing apparatus as defined in claim 1 wherein the mechanical means includes a trigger mechanism, and the fluid pressure responsive means includes a flexible diaphragm operatively connected to the trigger mechanism and movable to control tripping of the trigger mechanism for releasing the valve from its first position.

7. In cleansing apparatus as defined in claim 1 wherein the mechanical means includes a trigger mechanism releasably holding the valve in its first position and having a lever for tripping the mechanism; a spring for rotating the valve to its second position; and the fluid pressure responsive means controls rotation of the lever to trip the mechanism and effect operation of the spring.

8. In cleansing apparatus as defined in claim 1 wherein a conduit connects the container outlet to the valve and is provided with first and second branches respectively connected to the reservoir and drain; the fluid pressure responsive means includes a chamber in fluid communication with the conduit, and a flexible diaphragm in the chamber and controlling the mechancial means, and means for restricting the flow of fluid through the first branch to divert fluid under pressure from the conduit into the chamber to actuate the diaphragm.

9. In cleansing apparatus as defined in claim 1 wherein the mechanical means includes a trigger mechanism releasably holding the valve in its first position and having a lever engaging the trigger mechanism and movable for tripping the mechanism, and a first spring for moving the lever to its tripping position; a second spring for rotating the valve to its second position; and the flexible diaphragm is connected to the lever and operable by fluid pressure to maintain the lever in engagement with the trigger mechanism against the action of the first spring, the first spring being operable to move the lever, upon the release of fluid pressure on the diaphragm, to trip the trigger mechanism and effect operation of the second spring to rotate the valve to its second position.

10. In cleansing apparatus having a fluid container provided with an outlet; a conduit connected to said outlet and having first and second branches respectively connected to a fluid storage reservoir and to a drain; a valve having a first position to direct fluid through said first branch to said storage reservoir and having a second position to direct fluid through said second branch to said drain; and pump means operative to pump fluid from said container to said valve, the combination therewith of control means for said valve including a first spring for biasing said valve to its second position; trigger mechanism operative to hold said valve in its first position against the biasing action of said first spring and trippable for releasing said valve for movement to its second position by said first spring, said trigger mechanism including a first control member connected to said valve and engaged by said first spring and operative thereby to move said valve to its second position, a second control member engaging and releasably holding said first control member in the first valve position against the biasing action of said first spring, and a second spring biasing said second control member to release its engagement with said first control member; a fluid responsive device having a fluid chamber in communication with said conduit, and a diaphragm responsive to the pressure of the pumped fluid, flowing through said conduit and said first branch thereof into said reservoir, to maintain said second control member in engagement with said first control member against the biasing action of said second spring, said second spring being operative to release said second control member from said first control member for operation of said first spring, upon evacuation of fluid from said conduit and thereby said chamber and resultant pressure drop on said diaphragm.

11. In cleansing apparatus as defined in claim 10 wherein the valve is rotatable between its first and second positions; the first control member is a disc rotatable with the valve and having a notch; and the second control member is a trip lever having one end received in the notch of the disc and its other end engaged by the diaphragm.

12. In cleansing apparatus as defined in claim 10 wherein the trigger mechanism includes a third control member manually operative to engage and hold the second control member in the first valve position and releasable from said second control member, during operation of the diaphragm by fluid under pressure in the chamber, for movement of said second control member by the diaphragm into engagement with said first control member.

13. In cleansing apparatus as defined in claim 12 wherein a third spring is connected to the first control member and to the third control member and biases said third control member for movement relative to said first control member upon release of said third control member by said second control member.

14. In cleansing apparatus as defined in claim 12 wherein the third control member is a disc manually rotatable relative to the valve and first control member and has a notch, and the second control member is a trip lever having one end received in the notch of the disc and its other end engaged by the diaphragm, and a third spring connecting the disc and first control member and biasing said disc for rotation relative to said first control member upon release of said disc by said lever.

15. In cleansing apparatus as defined in claim 12 wherein the third control member is engaged by said second control member by the second spring, and is released upon movement of the second control member by the diaphragm in response to fluid under pressure acting on the diaphragm.

References Cited

UNITED STATES PATENTS

| | | | |
|---|---|---|---|
| 2,296,648 | 9/1942 | McMahon | 137—458 XR |
| 2,302,012 | 11/1942 | Dyer | 68—23 |
| 2,539,407 | 1/1951 | Dinley | 137—625.44 XR |
| 2,620,820 | 12/1952 | Born | 137—458 |
| 2,893,416 | 7/1959 | Hegstad | 137—119 |
| 2,924,959 | 2/1960 | Israel | 68—18 |
| 2,931,199 | 4/1960 | Steffey | 68—12 |
| 3,220,553 | 11/1965 | Growall et al. | 137—116 XR |

OTHER REFERENCES

DAS 1,115,708, Germany, Geldhof, 68/Digest, publ. 8, 1956.

STANLEY N. GILREATH, *Primary Examiner.*

WERNER H. SCHROEDER, *Assistant Examiner.*

U.S. Cl. X.R.

68—208; 137—625.44